Jan. 20, 1925.
H. SCHWEITER
DOUBLING AND SPINNING SPINDLE
Filed Feb. 13, 1924
1,523,724
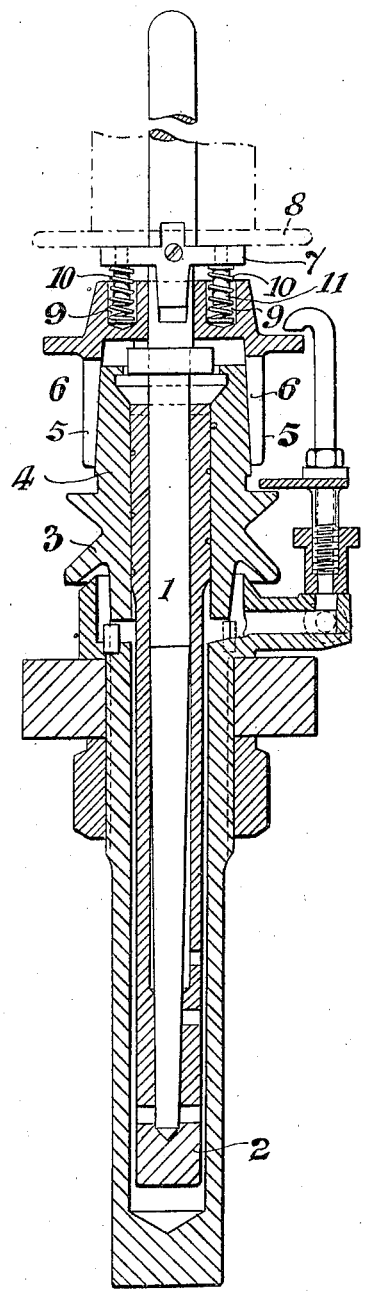
Inventor.
Hans Schweiter
Per Ferdinand Brosler Bosshardt
Attorney Patented Jan. 20, 1925.

1,523,724

UNITED STATES PATENT OFFICE.

HANS SCHWEITER, OF HORGEN, SWITZERLAND.

DOUBLING AND SPINNING SPINDLE.

Application filed February 13, 1924. Serial No. 692,577.

*To all whom it may concern:*

Be it known that I, HANS SCHWEITER, a Swiss citizen, residing at Horgen, in the Canton of Zurich, Switzerland, have invented a new and useful Improvement in Doubling and Spinning Spindles, of which the following is a specification.

This invention relates to doubling and spinning spindles adapted to be connected frictionally to the drive.

The object of my invention is to strengthen the frictional connection.

I attain this object by the means illustrated in the accompanying sheet of drawings which illustrate a constructional example of the invention in vertical section.

Referring to the drawing the spindle proper 1 is carried at the bottom in a bearing 2. The warve 3 is provided with a coupling cone 4 adapted to engage with a complimentary coupling cone 5 provided with slits 6 and mounted loose on the spindle 1. The coupling cone 5 is adapted to drive the spindle 1 together with the spool 8 through a carrier 7. Small springs 10 are inserted in holes 9 in the cone 5 and project above the top of the cone.

The carrier 7 presses on the springs 10 and the strength of these springs is conveniently so chosen that four-fifths of the weight of the spindle 1 and spool 8 acts on the springs and thereby strengthens or increases the friction between the coupling members, whilst one fourth of the said weight acts on the bearing 8.

Instead of springs 10 other elastic members, for example rubber members, small air cushions, and so forth may be introduced between the carrier and the driven coupling member.

The slits 6 enable the driven coupling member to spring easily.

In order to prevent the springs 10 from being thrown out under centrifugal action, the carrier 7 is provided with guide pins 11.

It will be appreciated that my invention consists in causing the greater part of the weight of the spindle together with the spool thereon to act as a load on the removable driven part of the frictional connection for the purpose of strengthening the effect of the connection.

I claim:—

1. In a doubling and spinning spindle, a driving friction coupling member; a driven friction coupling member engaging the first named member and means between the spindle and the second named member to transfer a portion of the weight of the spindle and object mounted thereon to the second named member, whereby frictional effect between the two members is increased.

2. In a doubling and spinning spindle, a driving friction coupling member; a driven friction coupling member mounted loose on the spindle and adapted to engage the driving coupling member, carrier means provided on the spindle to connect the spindle to the driven coupling member and elastic means between the carrier and the driven coupling member adapted to cause some of the weight of the spindle and body carried thereby to act on the driven coupling member in an engaging direction.

3. In a doubling and spinning spindle, a friction coupling comprising two members; carrier means on the spindle loosely connected to one of the said members and spring means between the carrier and the last named member acted on by the weight of the spindle and body carried thereby to press the last named member towards the other member of the friction coupling.

Signed at Zurich, in the Canton of Zurich, Switzerland, this 24th day of January, 1924.

HANS SCHWEITER.

Witnesses:
A. F. CALCOEN,
JAMES A. WILKINSON.